US006798336B2

(12) United States Patent
Kanda et al.

(10) Patent No.: US 6,798,336 B2
(45) Date of Patent: Sep. 28, 2004

(54) ELECTRONIC CONTROL SYSTEM USING SINGLE RECEIVER FOR DIFFERENT CONTROL MODES

(75) Inventors: Yasushi Kanda, Kariya (JP); Takashi Tanaka, Nagoya (JP)

(73) Assignee: Denso Corporation, Kariya (JP)

( * ) Notice: Subject to any disclaimer, the term of this patent is extended or adjusted under 35 U.S.C. 154(b) by 422 days.

(21) Appl. No.: 09/901,590

(22) Filed: Jul. 11, 2001

(65) Prior Publication Data

US 2002/0017978 A1 Feb. 14, 2002

(30) Foreign Application Priority Data

Aug. 11, 2000 (JP) ....................................... 2000-244499

(51) Int. Cl.$^{7}$ ......................... G05B 19/00; B60R 25/10; B60R 25/04; H04Q 7/00; G08C 17/00

(52) U.S. Cl. ................ 340/5.61; 340/5.63; 340/426.16; 340/426.17; 340/7.32; 370/311; 307/10.5

(58) Field of Search .............................. 307/10.2, 10.5; 340/5.62, 5.72, 5.61, 426, 435, 542, 505, 5.65; 713/200; 370/311

(56) References Cited

U.S. PATENT DOCUMENTS 4,897,643 A * 1/1990 Shibata et al. ......... 340/825.69
5,319,364 A * 6/1994 Waraksa et al. ....... 340/825.72
6,359,348 B1 * 3/2002 King ......................... 307/10.1
6,549,115 B1 * 4/2003 Daiss et al. ................ 340/5.31
6,570,486 B1 * 5/2003 Simon et al. ............... 340/501
6,583,715 B1 * 6/2003 Benzie et al. .............. 340/5.64
6,606,492 B1 * 8/2003 Losey ........................ 455/411

FOREIGN PATENT DOCUMENTS

| | | |
|---|---|---|
| EP | 937844 | 8/1999 |
| JP | 9-105254 | 4/1997 |
| JP | 10-227161 | 8/1998 |

* cited by examiner

*Primary Examiner*—Michael Horabik
*Assistant Examiner*—K. Hamilton
(74) *Attorney, Agent, or Firm*—Posz & Bethards, PLC

(57) ABSTRACT

In a remote vehicle door control, a single receiver is used for both a wireless control whereby a door lock actuator is controlled according to an operating command transmitted by a wireless signal in conjunction with user operation of a communication device carried by a user, and a smart control whereby the door lock actuator is controlled automatically after completing a two-way communication process with the communication device. An arbitration means is provided to determine to which one of the wireless control and the smart control the receiver is assigned. If the receiver receives a wireless signal from the communication device, use of the receiver is assigned to the wireless control.

8 Claims, 7 Drawing Sheets

ELECTRONIC CONTROL SYSTEM USING SINGLE RECEIVER FOR DIFFERENT CONTROL MODES

CROSS REFERENCE TO RELATED APPLICATION

This application is based on and incorporates herein by reference Japanese Patent Application No. 2000-244499.

BACKGROUND OF THE INVENTION

The present invention relates generally to an electronic control system for controlling a door lock actuator or other similar devices through wireless communication with a communication device such as an electronic key carried by a user of a motor vehicle. More specifically, the present invention relates to an electronic control device that shares one receiver for two types of controls.

Some motor vehicle control systems has a wireless control system by which doors of a vehicle are locked and unlocked from a remote position by manual operation on an electronic key carried by a vehicle user. In this system, the electronic key sends a wireless signal and an electronic control device mounted in the vehicle drives a door actuator to lock or unlock the door in response to the instruction of the wireless signal. The wireless signal includes an identification code specific to the vehicle so that the electronic control device allows the door lock or unlock operation only when the identification code is proper.

Other motor vehicle control systems has a smart control system. In this system, an electronic control device mounted in a motor vehicle detects approaching of a vehicle user carrying an appropriate electronic key and then automatically unlock or lock doors.

When this smart control system determines that conditions requiring confirmation of the presence of an electronic key are satisfied (referred to below as the conditions being true), the electronic control device mounted in the vehicle runs a verification process to authenticate that the electronic key is valid, that is, the electronic key is valid for use with that vehicle. It does this by transmitting a wireless signal from a transmitter and receiving a corresponding response signal from the electronic key through a receiver. It should be noted that in order to improve security, this verification process generally exchanges data with the electronic key plural times.

The electronic key is designed to send a response signal in response to the wireless signal according to predefined rules. If the electronic key is within the range in which the wireless signal from the vehicle can be received, the electronic control device mounted in the vehicle can recognize the presence of the electronic key, that is, the presence of the user carrying the electronic key.

The electronic control device then automatically unlocks the door when it is confirmed that the electronic key is in close proximity to the vehicle by, for example, detecting by a touch sensor whether a user hand has been placed on the external door handle. The electronic control device unlocks the door by controlling the door lock actuator to switch automatically to the unlock position. When a user gets out of the vehicle and the electronic control device detects that a door lock switch disposed beside the external door handle has been pressed, the electronic control device automatically locks the doors by setting the door lock actuator automatically to the lock position.

When a control system providing both the above wireless control and smart control functions is designed, the electronic key carried by the vehicle user operates as a communication device equipped with the functions of both the above electronic keys. The electronic key can be configured to transmit a wireless signal instructing the control device to lock or unlock the door when the user presses a particular button, and to return a response signal to the wireless signal received from the vehicle when the buttons are not operated.

However, the electronic control device in the vehicle must have separate receivers for receiving wireless signals for wireless control and smart entry control from the electronic key. This tends to cause an increase in device size and cost.

SUMMARY OF THE INVENTION

It is therefore an object of the present invention to provide an electronic control device which enables a single receiver to be shared for wireless control and a smart control.

According to the present invention, an electronic control system comprises a communication device carried by a user, a receiver for receiving a wireless signal from the communication device, a transmitter for transmitting a wireless signal to the communication device, a wireless control unit for using the receiver to receive an operating signal transmitted from the communication device to operate a specific device such as a door lock actuator of a vehicle, a smart control unit for driving the transmitter to transmit a transmitter signal and using the receiver to receive a response signal from the communication device transmitted in return to the transmitter signal, and automatically controlling the specific device in response to the response signal from the communication device. The system further comprises an arbitration unit for granting a receiver usage privilege to one of the wireless control unit and the smart control unit.

The arbitration unit supplies power to the receiver to operate the receiver if a receiver usage privilege acquisition instruction is output from either one of the wireless control unit and the smart control unit. The arbitration unit assigns a receiver usage privilege to the wireless control unit to enable the wireless control unit to receive data if the receiver received the wireless signal. The arbitration unit assigns the receiver usage privilege to the smart control unit if the receiver did not receive the wireless signal and the smart control unit has output the usage privilege acquisition instruction and stops power supply to the receiver and stops receiver operation, if a receiver usage privilege cancellation instruction is output from one of the wireless control unit and the smart control unit to which the receiver usage privilege has been assigned.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

A preferred embodiment of the present invention is described as implemented in an electronic key system for a vehicle.

Figure 1:
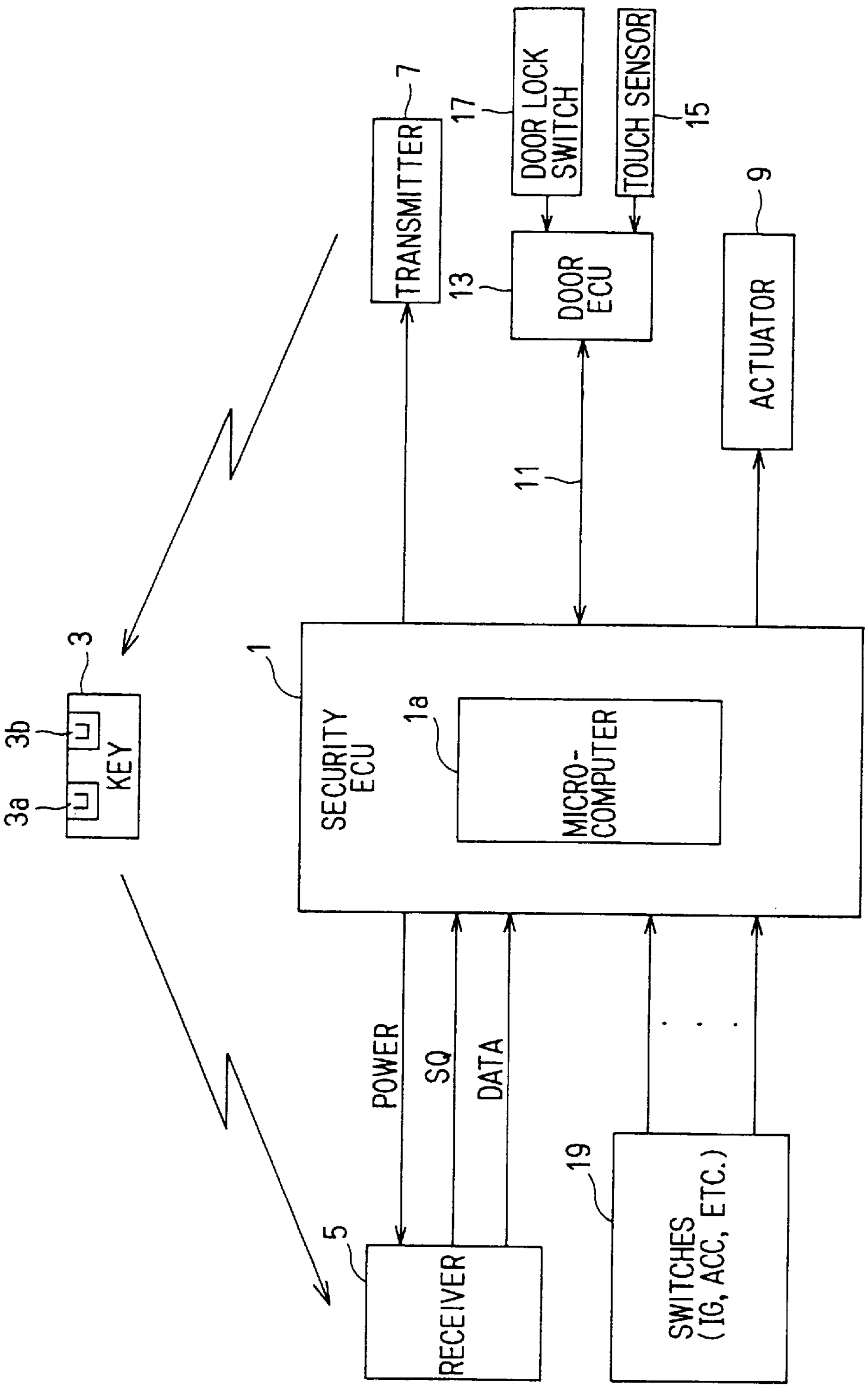
FIG. 1 is a block diagram showing an electronic key system according to a preferred embodiment of the present invention.

As shown in FIG. 1, this electronic key system mounted in a vehicle has a security ECU (electronic control unit) 1 for handling wireless control and smart control of vehicle doors. The security ECU 1 comprises a microcomputer 1*a* as a central control processing unit, and handles wireless control and smart control of the doors as unit of a vehicle theft prevention and other security features of the vehicle.

The security ECU 1 is connected to a receiver (wireless tuner) 5 and a transmitter 7. The receiver 5 receives wireless signals transmitted from an electronic key 3, which functions as a portable communication device carried by a vehicle user. The transmitter 7 transmits wireless signals from the vehicle to the electronic key 3.

The receiver 5 operates with electric power supplied from the security ECU 1. The receiver 5 demodulates a wireless signal from the electronic key 3, and outputs received data contained in the wireless signal to the security ECU 1. When the receiver 5 receives some sort of wireless signal from the electronic key 3 (that is, an RF signal from the electronic key 3 in this embodiment), it outputs a high RF presence signal SQ indicating that an RF signal was received to the security ECU 1. When a wireless signal from the electronic key 3 is not received, the receiver 5 outputs a low RF presence signal SQ, indicating that an RF signal is not received.

The transmitter 7 converts transmitted data supplied from the security ECU 1 (that is, data to be sent to the electronic key 3) to a wireless signal in a specific frequency band, and then transmits the resulting signal to the vicinity of the vehicle.

The security ECU 1 is connected to a door lock actuator 9. It should be noted that a door lock actuator 9 is provided for each door of the vehicle, but only one actuator is shown in FIG. 1. The door lock actuator 9 locks or unlocks the door as the case may be according to a control signal from the security ECU 1.

The security ECU 1 is connected to a door ECU 13 and other ECUs (not shown in the figure) by way of a communication bus 11. A touch sensor 15 and a door lock switch 17 are connected to the door ECU 13. The touch sensor 15 detects when a user puts his hand in the external door handle of the driver's door. The door lock switch 17 is disposed near the external door handle of the driver's door.

The security ECU 1 is connected to a number of switches 19. These switches 19 include an ignition (IG) switch, which turns on when the ignition key is inserted in the key cylinder beside a steering wheel and turned to the ignition (IG) position; an accessory (ACC) switch, which turns on when the ignition key inserted in the key cylinder is turned to the ACC position; and door switches, which turn on when the respective vehicle door is open.

The security ECU 1 communicates with the door ECU 13 to check whether the user's hand is on the external door handle of the driver's door and whether the door lock switch 17 was operated. The security ECU 1 detects from the signals supplied from the various switches 19 other information about vehicle conditions that cannot be determined from the door ECU 13. The security ECU 1 also outputs information determined from the signals output from switches 19 to the communication bus 11 for supply to the door ECU 13 and other ECUs.

The electronic key 3 is a small electronic unit disposed typically at one end of the vehicle ignition key inserted in the key cylinder. It also typically has a lock button 3*a* for locking the vehicle doors, and an unlock button 3*b* for unlocking the doors.

When the user presses the lock button 3*a*, the electronic key 3 transmits a wireless signal as an operating command instructing the system to lock the door (this signal is referred to as a "lock signal" below). When the unlock button 3*b* is pressed, the electronic key 3 similarly transmits a wireless signal (referred to as a "unlock signal" below) as an operating command instructing the system to unlock the door.

When the security ECU 1 provides wireless control of the door locks by, for example, driving the door lock actuators 9 for all of the doors to the lock position when a lock signal is received from the electronic key 3 via the receiver 5, and driving all of the door lock actuators 9 to the unlock position when an unlock signal is received from the electronic key 3 via receiver 5.

It will be obvious that identification information (such as an encryption code) unique to the electronic key 3 is added to or contained in the lock and unlock signals transmitted from the electronic key 3. The security ECU 1 operates the door lock actuators 9 only when the identification information received from the electronic key 3 is verified to match the identification information pre-stored in the security ECU 1, that is, the electronic key 3 matches the security ECU 1. The electronic key 3 could also be provided with only one door lock operating button so that the same type of operating signal is transmitted each time the button is pressed. In this case the security ECU 1 controls the door lock actuators 9 to the lock or unlock position according to the actuator position or other vehicle conditions when the operating signal is received from the electronic key 3. For example, if the driver's door is locked when the signal is received, all door lock actuators 9 are driven to the unlock position. However, if the driver's door is unlocked when the signal is received, all door lock actuators 9 are driven to the lock position.

The electronic key 3 is also configured to return an appropriate response signal if a wireless signal of predetermined specific content is received when buttons 3*a* and 3*b* are not operated.

This means that the security ECU 1 can also provide a smart entry control function. More specifically, when certain conditions requiring confirmation of the proximity of electronic key 3 are met (referred to as the "smart control enabling conditions"), the security ECU 1 checks whether the electronic key 3 is within a range of the transmitter 7 by sending a wireless signal of specific content from the transmitter 7, and then receiving a response signal from the electronic key 3 to that wireless signal by way of the receiver 5. The security ECU 1 then runs a verification process to confirm if a responding electronic key 3 is the authorized companion key (that is, if the responding electronic key 3 actually matches the vehicle). That is, the security ECU 1 verifies the response signal sent from the electronic key 3 in response to the wireless signal transmitted from the transmitter 7, and confirms whether the electronic key 3 matches the vehicle. This verification process exchanges data with the electronic key 3 plural times to further improve security.

If the security ECU 1 detects that a key is not inserted in the key cylinder and the driver's door is locked (that is, the vehicle is parked), it thus determines that the smart control enabling conditions are met. The security ECU 1 transmits a wireless signal of specific content from the transmitter 7. If the user carrying the electronic key 3 (typically the vehicle driver) is in proximity to the vehicle and the electronic key 3 returns a response signal to the signal from the transmitter 7, the security ECU 1 receives the response signal via the receiver 5 and then repeats a two-way exchange of data for verification with the electronic key 3 according to a predetermined procedure plural times. If as a result of this two-way exchange of data for verification the responding electronic key 3 is confirmed by the security ECU 1 to correspond to the vehicle in which the security ECU 1 is installed, and it is also confirmed that a user's hand is inserted in the external door handle on the driver's door, all door lock actuators 9 are automatically driven to the unlock position. This type of smart unlock control enables the door to be automatically unlocked when the user of the vehicle simply inserts his hand to the handle on the driver's door.

Furthermore, if the security ECU 1 detects that the door lock switch 17 is pressed when the key is not inserted in the key cylinder and the driver's door is not locked, it thus detects that smart control enabling conditions are met. The security ECU 1 sends a wireless signal of specific content from the transmitter 7. If as a result of the same two-way exchange of data for verification the electronic key 3 is authenticated by the security ECU 1, the security ECU 1 automatically drives the door lock actuators 9 to the lock position. This type of smart lock control enables the vehicle user to easily lock the doors by simply pressing the door lock switch 17 on the driver's door when leaving the vehicle.

It will thus be obvious that an electronic key system according to this preferred embodiment uses only one receiver 5 mounted in the vehicle for both wireless control and smart control functions.

Figure 2:
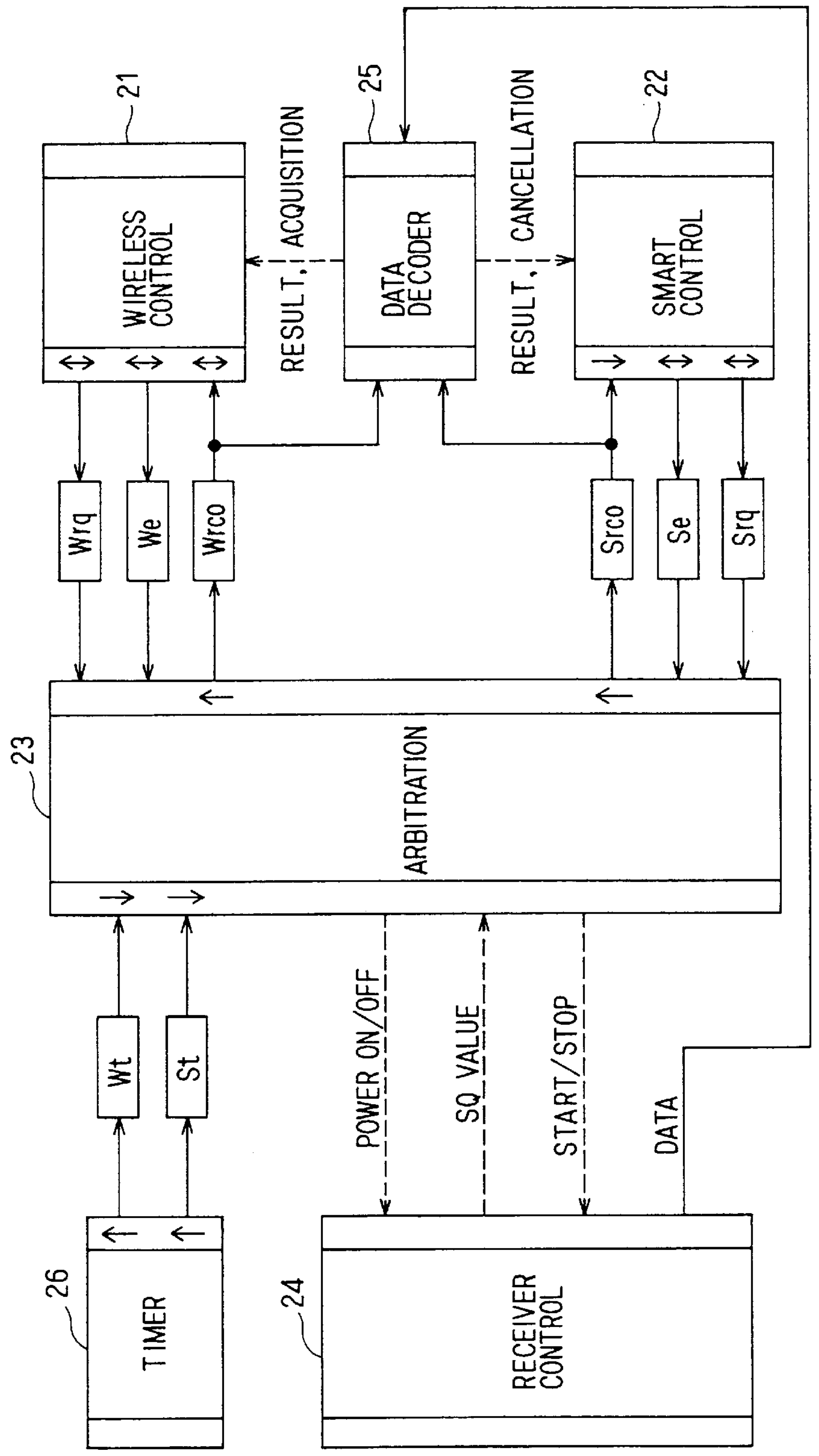
FIG. 2 is a functional block diagram showing a program run by a microcomputer of the electronic key system shown in FIG. 1.

The security ECU 1 (more specifically the microcomputer 1*a*) is programmed to have functions in software shown in FIG. 2.

As shown in FIG. 2, the program has a wireless control unit 21 providing the above wireless control, a smart control unit 22 providing the above smart control, an arbitration unit 23 for arbitrating usage privileges to the receiver 5 (that is, the right to use the receiver 5) between the wireless control unit 21 and smart control unit 22, a receiver control unit 24 for controlling the receiver 5 according to instructions from the arbitration unit 23, a received data decoder unit 25 for decoding the data received via the receiver 5, and a timer unit 26 for repeatedly monitoring passage of a uniticular unit of time (150 ms in this preferred embodiment).

It will be noted that in this preferred embodiment the program stored in ROM (not shown in the figures) in microcomputer 1*a* and run by the security ECU 1 is written in an object-oriented programming language, a programming language that divides all program functions into function units. Each of function units is programmed as an object, which is a programming module combining data and a uniticular method (a sequence of steps for processing the data).

Each of the units 21 to 26 shown in FIG. 2 is an object (method plus data) stored in ROM in microcomputer 1*a*. Furthermore, expressions in which one of these objects is the subject of the sentence, such as "the wireless control unit 21 does this" or "the arbitration unit 23 does that," means in practice that as a result of the microcomputer 1*a* operating according to the method of the object (more specifically, as a result of the microcomputer 1*a* running the method of the object), the achieved functional means performs "this" or "that" operation.

It should also be noted that to "set a flag" as used below means to set the value of the flag to "1", and to "clear a flag" means to set the value of the flag to "0." Furthermore, the arrows shown inside the borders of objects 21, 22, 23, and 26 in FIG. 2 are defined as follows based on the direction in which the arrows point. Upward pointing arrows mean the flag is set by the object inside that border. Downward pointing arrows mean the flags are cleared by the object inside that border. Flags pointing both up and down mean that the flags are set or cleared by the object inside that border.

When the receiver power-on instruction is output from the arbitration unit 23, the receiver control unit 24 supplies power to drive the receiver 5, and thereafter supplies the value of the RF presence signal SQ (a binary value indicating whether the RF presence signal SQ is high or low) from the receiver 5 to the arbitration unit 23. If the data collection start instruction is output from the arbitration unit 23 while power is supplied to the receiver 5, the receiver control unit 24 starts a received data collection operation for supplying data received from the receiver 5 to the received data decoder unit 25. When the data collection stop instruction is then received from the arbitration unit 23, the receiver control unit 24 stops the data collection operation. When the receiver power-off instruction is output from the arbitration unit 23, the receiver control unit 24 stops the power supply to the receiver 5.

The timer unit 26 clocks the passage of 150 ms periods, and sets a wireless period start event flag Wt each time 150 ms passes (that is, at the start of each 150 ms period). The timer unit 26 also sets a smart period start event flag St once every two times the wireless period start event flag Wt is set. This means that the wireless period start event flag Wt is set every 150 ms, and the smart period start event flag St is set every 300 ms. Both of these flags Wt and St are cleared by the arbitration unit 23 as described further below.

Following the procedure further described below according to the flags Wrq and We set and cleared by the wireless control unit 21, and flags Srq and Se set and cleared by smart control unit 22, the arbitration unit 23 outputs the receiver power-on instruction to the receiver control unit 24 to drive the receiver 5 and enables either the wireless control unit 21 or smart control unit 22 to use the receiver 5. When use of the receiver 5 is passed to wireless control unit 21, the arbitration unit 23 sets the wireless control usage flag Wrco. When use of the receiver 5 is passed to the smart control unit 22, it sets the smart control usage flag Srco.

The received data decoder unit 25 decodes the content of the received data supplied from the receiver 5 through receiver control unit 24, and supplies the result to wireless control unit 21 and smart control unit 22.

When the smart control usage flag Srco is set (that is, arbitration unit 23 has given the receiver 5 usage privilege to smart control unit 22), the received data decoder unit 25 checks whether the content of the data from the receiver control unit 24 is a signal used by wireless control (a lock signal or unlock signal). If the received data content is a signal used by wireless control (that is, if it is determined that a lock signal or unlock signal was received by the receiver 5 from electronic key 3), the received data decoder unit 25 sends the usage privilege cancellation instruction to the smart control unit 22, telling it to release the receiver 5, and then outputs the usage privilege acquisition instruction to the wireless control unit 21, telling it to assume use of the receiver 5.

If the wireless control enabling conditions (such as a key is not inserted in the key cylinder) are met, indicating that receipt of a lock signal or unlock signal from the electronic key 3 should be checked, the wireless control unit 21 sets the start wireless period request flag Wrq and sends the flag Wrq to the arbitration unit 23 to request control of the receiver 5. If the wireless control enabling conditions are not satisfied, the start wireless period request flag Wrq is cleared.

If the wireless control usage flag Wrco is set by the arbitration unit 23 (that is, use of the receiver 5 has been assigned to the wireless control unit 21), the wireless control unit 21 runs a process for receiving a lock signal or unlock signal from electronic key 3 using the receiver 5. More specifically, a receive process for capturing the result of data decoding by the received data decoder unit 25. When this process ends, the wireless control unit 21 clears wireless control usage flag Wrco, and notifies the arbitration unit 23 that it has released control of the receiver 5. The wireless control unit 21 also drives the door lock actuator 9 to the lock or unlock position according to the content of the received data detected in this receive process.

When the usage privilege acquisition instruction is output from received data decoder unit 25, wireless control unit 21 sets the immediate wireless control request flag We requesting the arbitration unit 23 to provide immediate access to the receiver 5. The immediate wireless control request flag We is then cleared after receiver 5 usage privileges are received and receiving data ends.

When the smart control enabling conditions enabling the door lock actuator 9 to be automatically set to the unlock position are met (that is, a key is not inserted in the key cylinder of the vehicle and the driver's door is locked, referred to below as the smart unlock control conditions), the smart control unit 22 sets the smart period start request flag Srq asking the arbitration unit 23 for use of the receiver 5. When the smart unlock control conditions are not met, the smart control unit 22 clears the smart period start request flag Srq.

When the smart control enabling conditions enabling the door lock actuator 9 to be automatically set to the lock position are met (that is, a key is not inserted in the key cylinder of the vehicle, the driver's door is not locked, and the door lock switch 17 is pressed, referred to below as the smart lock control conditions), the smart control unit 22 sets the immediate smart control request flag Se requesting the arbitration unit 23 to provide immediate use of the receiver 5. When the smart lock control conditions are not met, the smart control unit 22 clears the immediate smart control request flag Se.

When the smart control usage flag Srco is set by the arbitration unit 23 (that is, use of the receiver 5 has been assigned to the smart control unit 22), the smart control unit 22 runs the above verification process. That is, the smart control unit 22 transmits a wireless signal of specific content from the transmitter 7, obtains the decoded result of any response signal to that wireless signal received from the electronic key 3 from the received data decoder unit 25, and thereby checks if an authorized electronic key 3 is in proximity to the vehicle. Depending upon the result of this verification process, smart control unit 22 automatically controls the door lock actuator 9. If use of the receiver 5 is no longer necessary when the verification process ends, smart control unit 22 clears the smart control usage flag Srco and notifies the arbitration unit 23 that it has released the receiver 5.

When the above usage privilege cancellation instruction is output from received data decoder unit 25, smart control unit 22 immediately clears the smart control usage flag Srco.

Figure 3:
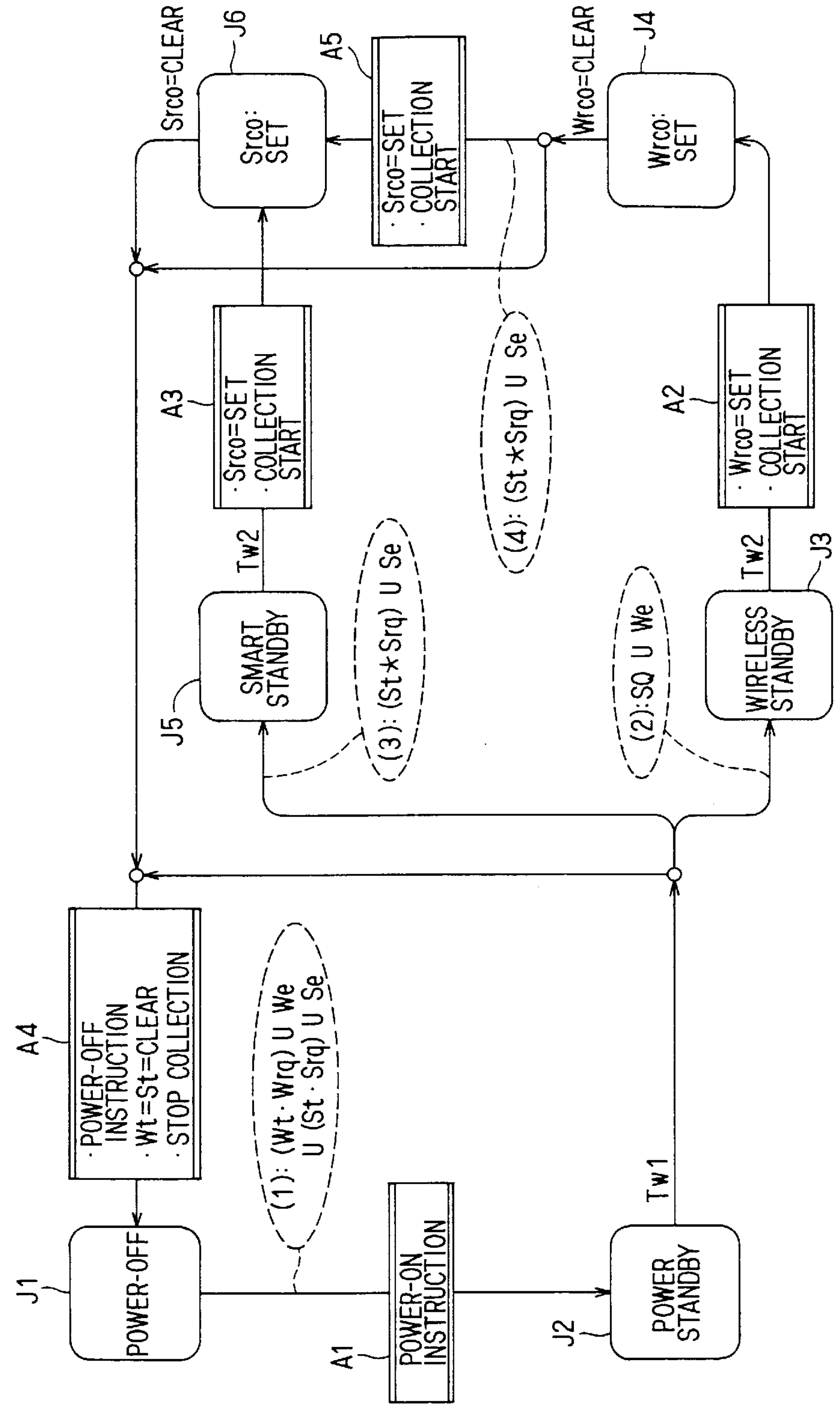
FIG. 3 is a state transition diagram showing the functions of an arbitration unit shown in FIG. 2.

The functions of arbitration unit 23 are described next below with reference to FIG. 3. FIG. 3 is a state transition diagram for the functions of the arbitration unit 23.

At system startup, the arbitration unit 23 is set to state J1 (the receiver power-off state) in which receiver power supply to the receiver control unit 24 is turned off. When in this receiver power-off state J1, the arbitration unit 23 checks if any of the following conditions (1)-1 to (1)-4 are true.

Condition (1)-1: Both the wireless period start event flag Wt and start wireless period request flag Wrq are set (=1). It should be noted that this condition is indicated as (Wt*Wrq) inside dotted oval (1) in FIG. 3. "U" indicates a logical OR.

Condition (1)-1: The immediate wireless control request flag We is set. This condition is indicated as (We) inside dotted oval (1) in FIG. 3.

Condition (1)-3: Both the smart period start event flag St and smart period start request flag Srq are set. This condition is indicated as (St*Srq) in (1) in FIG. 3.

Condition (1)-4: The immediate smart control request flag Se is set. This condition is indicated as (Se) in (1) in FIG. 3.

If arbitration unit 23 determines that any of conditions (1)-1 to (1)-4 are met in the receiver power-off state J1, it sends the receiver power-on instruction to the receiver control unit 24 in instruction state A1 in FIG. 3, so that the power is supplied to the receiver 5. This causes the receiver 5 to start operating.

After outputting the receiver power-on instruction (A1 in FIG. 3), the arbitration unit 23 enters the receiver power stabilizing state J2 in which the arbitration unit 23 waits for a specified period Tw1 considered sufficient for the actual power supply to the receiver 5 to stabilize.

When this specified period Tw1 passes, the arbitration unit 23 checks if either of the following conditions (2)-1 or (2)-2 is true.

Condition (2)-1: The RF presence signal SQ supplied from receiver 5 via receiver control unit 24 is set to the value indicating the RF signal is present (=1 in this embodiment). This condition is indicated by SQ in (2) in FIG. 3.

Condition (2)-2: The immediate wireless control request flag We is set. This condition is indicated by We in (2) in FIG. 3.

If either condition (2)-1 or (2)-2 is true, arbitration unit 23 enters a wireless reception standby state J3 in which it waits a specified period Tw2 considered sufficient for reliable reception of signals (lock and unlock signals for wireless control in this case) from the electronic key 3 to be enabled. When this specified period Tw2 passes in state J3, arbitration unit 23 sets the wireless control usage flag Wrco and sends the data collection start instruction to the receiver control unit 24 at state A2 in FIG. 3. The arbitration unit 23 then enters a Wrco set state J4 in which it waits for the wireless control usage flag Wrco to be cleared by the wireless control unit 21.

The receiver control unit 24 thus supplies data received from the receiver 5 to received data decoder unit 25, and received data decoder unit 25 decodes the received data. The wireless control unit 21 thus receives the decoded data from received data decoder unit 25, and clears the wireless control usage flag Wrco when the receive data process is completed.

If neither condition (2)-1 or (2)-2 is true when arbitration unit 23 leaves the receiver power stabilizing state J2, it checks whether either of the following conditions (3)-1 or (3)-2 is true.

Condition (3)-1: Both the smart period start event flag St and smart period start request flag Srq are set. This condition is indicated as (St*Srq) in (3) in FIG. 3.

Condition (3)-2: The immediate smart control request flag Se is set. This condition is indicated as (Se) in (3) in FIG. 3.

If either condition (3)-1 or (3)-2 is true, arbitration unit 23 enters a smart reception standby state J5 in which it waits for a specified period Tw2, which is considered sufficient for reliable reception of signals (a verification process signal for smart control in this case) from the electronic key 3 to be enabled. When this specified period Tw2 passes in state J5, arbitration unit 23 sets the smart control usage flag Srco and sends the data collection start instruction to the receiver control unit 24 in state A3 as shown in FIG. 3. The arbitration unit 23 then enters an Srco set state J6 in which it waits for the smart control usage flag Srco to be cleared by the smart control unit 22.

In this case the smart control unit 22 runs the above verification process. Specifically, the smart control unit 22 transmits a wireless signal of specific content from the transmitter 7, the receiver control unit 24 supplies the response signal to this wireless signal from the electronic key 3 received by the receiver 5 to received data decoder unit 25. The received data decoder unit 25 decodes the received data and passes the result to the smart control unit 22. The smart control unit 22 can thus verify if an authorized electronic key 3 is in proximity to the vehicle. When this verification process ends, smart control unit 22 clears the smart control usage flag Srco.

If none of conditions (2)-1, (2)-2 or (3)-1, (3)-2 are true when the arbitration unit 23 leaves the receiver power stabilizing state J2, it clears the wireless period start event flag Wt and smart period start event flag St at state A4 shown in FIG. 3, sends the receiver power-off instruction and data collection stop instruction to the receiver control unit 24, and then returns to receiver power-off state J1.

However, if the wireless control usage flag Wrco is cleared by the wireless control unit 21 in Wrco set state J4, the arbitration unit 23 checks if condition (4)-1 or (4)-2 is true.

Condition (4)-1: Both smart period start event flag St and smart period start request flag Srq are set. This condition is indicated as (St*Srq) in (4) in FIG. 3.

Condition (4)-2: The immediate smart control request flag Se is set. This condition is indicated as (Se) in (4) in FIG. 3.

If either condition (4)-1 or (4)-2 is true, arbitration unit 23 sets the smart control usage flag Srco and sends the data collection start instruction to the receiver control unit 24 at state A5 shown in FIG. 3, and then enters an Srco set state J6.

If neither condition (4)-1 or (4)-2 is determined to be true when the arbitration unit 23 leaves the Wrco set state J4, event flags Wt and St are cleared, and the receiver power-off instruction and data collection stop instruction are sent to receiver control unit 24 (that is, the operation shown as A4 in FIG. 3), and the arbitration unit 23 returns to receiver power-off state J1.

It should be noted that if the smart control usage flag Srco is cleared by the smart control unit 22 in the Srco set state J6, the arbitration unit 23 again enters operation state A4 in FIG. 3 and then returns to the receiver power-off state J1.

The arbitration unit 23 allocates use of the receiver 5 as shown in timing diagrams of FIG. 4 to FIG. 7. It will be noted that in the timing diagrams shown in FIG. 4 to FIG. 7, both the wireless period start event flag Wt and smart period start event flag St are first set by the timer unit 26 at time t1, and the wireless period start event flag Wt is thereafter set at every time t2 to t34. The smart period start event flag St is thereafter set at every odd numbered time t3, t5, t7, and so forth.

Figure 4:
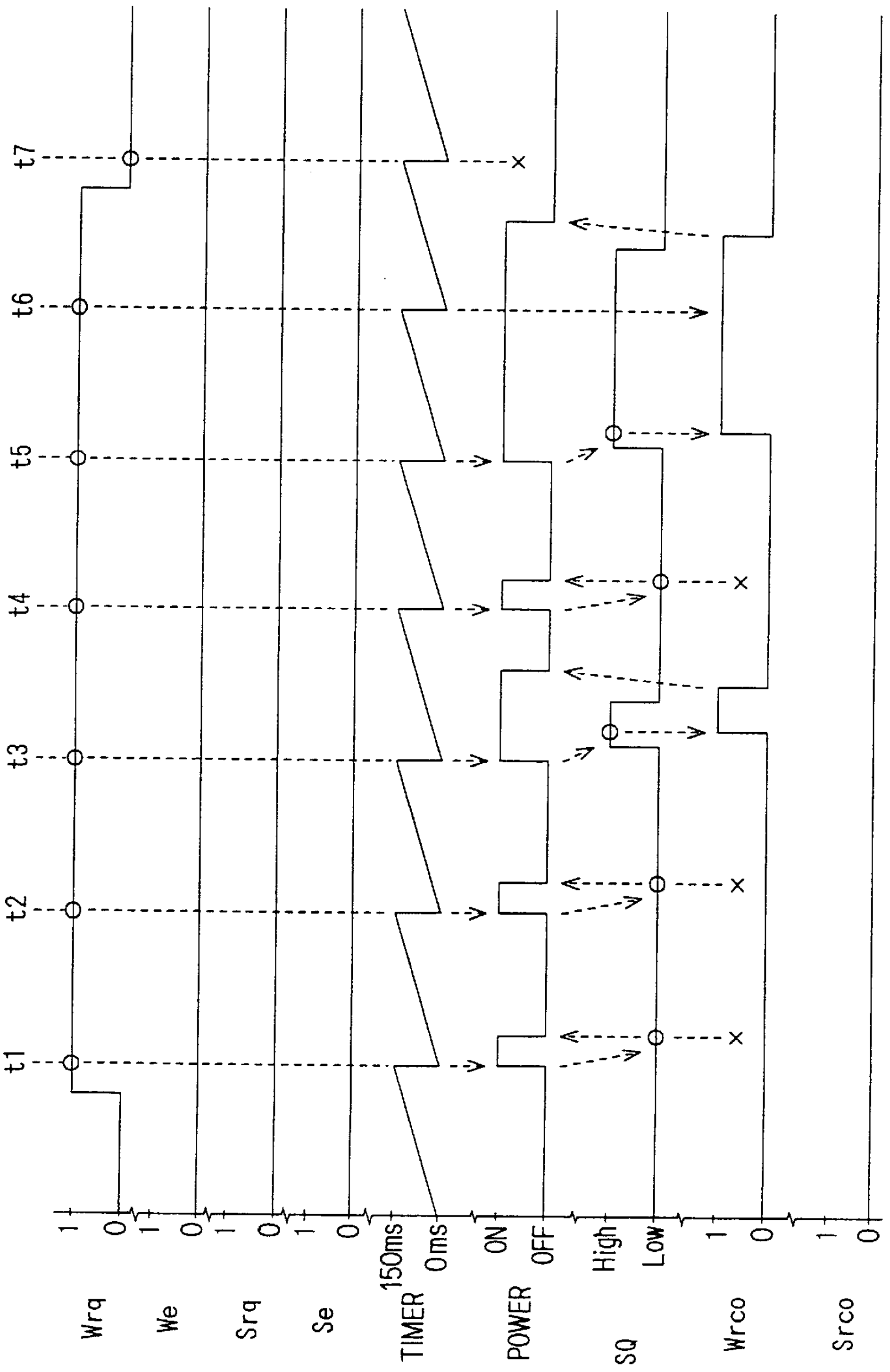
FIG. 4 is a first timing diagram showing operation of the arbitration unit.

Referring first to FIG. 4, if the arbitration unit 23 is in receiver power-off state J1 and the wireless control unit 21 sets the start wireless period request flag Wrq immediately before time t1, the arbitration unit 23 sends the receiver power-on instruction to the receiver control unit 24 at time t1 to supply power to the receiver 5 (operation state A1 in FIG. 3). This is because condition (1)-1 is true at time t1.

When specified period Tw1 passes, arbitration unit 23 checks if condition (2)-1 or (2)-2 is true. In this case the value of the RF presence signal SQ supplied from the receiver 5 via receiver control unit 24 indicates there is no RF signal (that is, a wireless signal is not received from the receiver 5), and the immediate wireless control request flag We is not set. As a result, neither condition (2)-1 or (2)-2 is true.

The arbitration unit 23 also checks if condition (3)-1 or (3)-2 is true. In this case neither the smart period start request flag Srq nor immediate smart control request flag Se is set. Thus, conditions (3)-1 and (3)-2 are not true. The arbitration unit 23 therefore clears event flags Wt and St, and sends the receiver power-off instruction and data collection stop instruction to receiver control unit 24 (operation state A4 in FIG. 3), and returns to the receiver power-off state J1.

When the wireless period start event flag Wt is set by the timer unit 26 at time t2 in FIG. 4, arbitration unit 23 detects that condition (1)-1 is now true and again supplies power to the receiver 5. As with the operation from time t1 to time t2, however, none of conditions (2)-1, (2)-2, (3)-1 and (3)-2 is true. Event flags Wt and St are thus cleared and the arbitration unit 23 returns to the receiver power-off state J1.

It is assumed that after the wireless period start event flag Wt is set again by the timer unit 26 at time t3 in FIG. 4 and the arbitration unit 23 supplies power to the receiver 5. Because condition (1)-1 is again true, the receiver 5 receives a wireless signal after specified period Tw1 passes. As a result, the RF presence signal SQ is set to indicate that an RF signal is present.

This causes condition (2)-1 to become true so that after the wireless reception standby state J3 the arbitration unit 23 sets the wireless control usage flag Wrco and sends the data collection start instruction to the receiver control unit 24 (operation state A2 in FIG. 3). The arbitration unit 23 then enters Wrco set state J4. That is, the arbitration unit 23 assigns use of the receiver 5 to the wireless control unit 21 in this case.

The wireless control unit 21 also receives the decoded data and then clears the wireless control usage flag Wrco when data reception is completed.

The arbitration unit 23 thus checks if condition (4)-1 or (4)-2 is true. In this case, however, neither smart period start request flag Srq nor immediate smart control request flag Se is set and hence neither condition (4)-1 or (4)-2 is true. The arbitration unit 23 therefore completes operation state A4 in FIG. 3 and returns to receiver power-off state J1.

It is noted that the operation shown at time t4 to t5 in FIG. 4 is identical to the operation at time t1 to t2 described above. In addition, the operation from time t5 to t7 in FIG.

4 is basically the same as that from time t3 to t4 except that the wireless control unit 21 clears the wireless control usage flag Wrco after time t6. Because the start wireless period request flag Wrq is cleared at time t7, none of conditions (1)-1 to (1)-4 is true, and the arbitration unit 23 therefore remains in the receiver power-off state J1.

Figure 5:
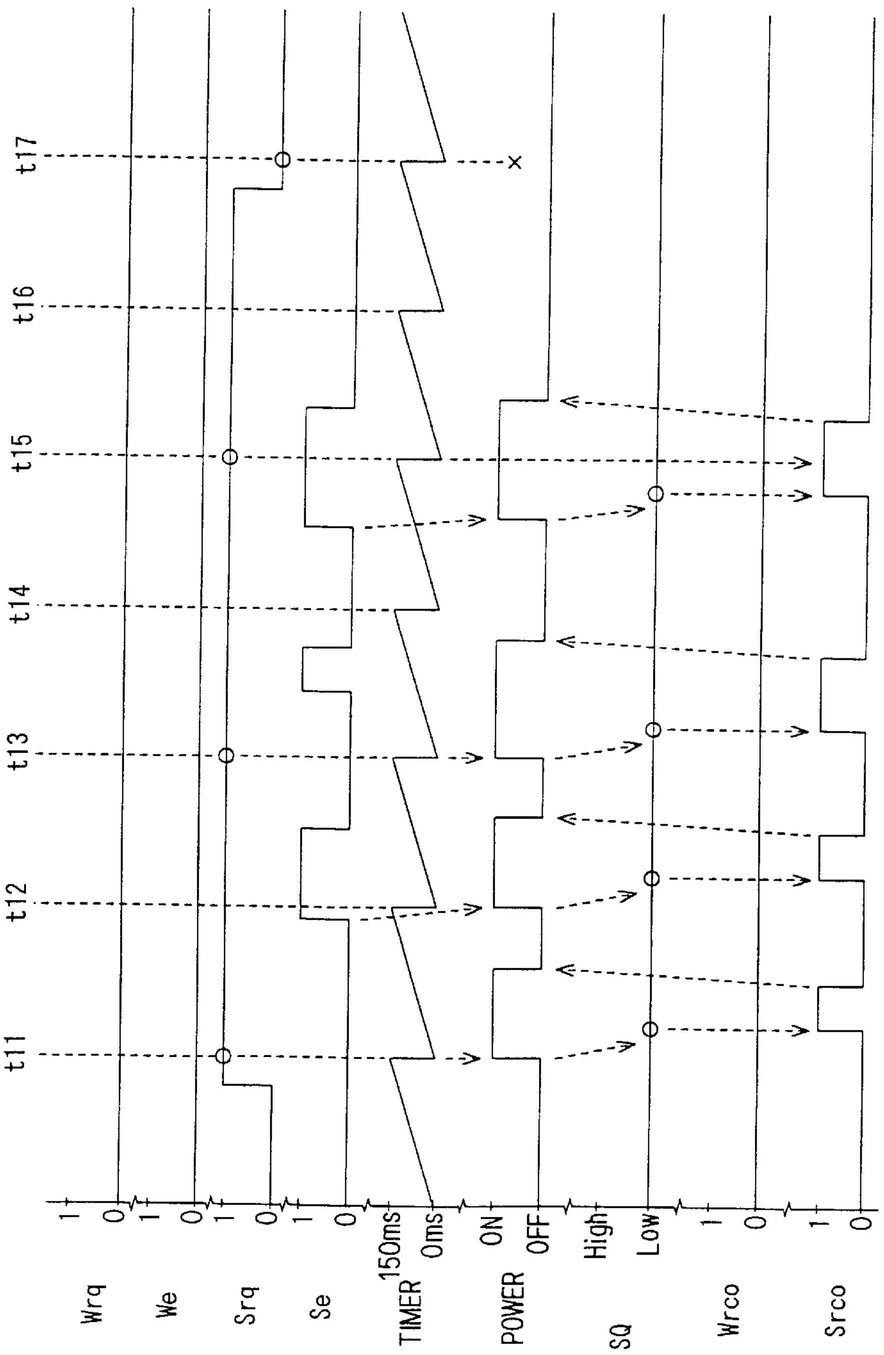
FIG. 5 is a second timing diagram showing operation of the arbitration unit.

Referring next to FIG. 5, it is assumed that when the arbitration unit 23 is in the receiver power-off state J1, the smart control unit 22 sets the smart period start request flag Srq immediately before time t11. As a result, the arbitration unit 23 sends the receiver power-on instruction to the receiver control unit 24 to supply power to the receiver 5 (operation state A1 in FIG. 3) at time t11. This is because condition (1)-3 is true at time t11.

When the specified period Tw1 passes, arbitration unit 23 checks if condition (2)-1 or (2)-2 is true. In this case the value of the RF presence signal SQ indicates there is no RF signal present, and the immediate wireless control request flag We is not set. As a result, neither condition (2)-1 or (2)-2 is true.

The arbitration unit 23 also checks if condition (3)-1 or (3)-2 is true. In this case the smart period start request flag Srq is set, and condition (3)-1 is therefore true. The arbitration unit 23 therefore waits for the smart reception standby state J5, and then sets the smart control usage flag Srco and sends the data collection start instruction to the receiver control unit 24 (operation state A3 in FIG. 3), and thus enters the Srco set state J6. That is, the arbitration unit 23 assigns receiver 5 usage privileges to smart control unit 22.

The smart control unit 22 thus runs the verification process, and clears the smart control usage flag Srco when the verification process ends.

The arbitration unit 23 thus again enters operation state A4 shown in FIG. 3. That is, event flags Wt and St are cleared, and the receiver power off instruction and data collection stop instruction are sent to receiver control unit 24. Then, the arbitration unit 23 returns to the receiver power-off state J1.

If the smart control unit 22 then sets the immediate smart control request flag Se, such as just before time t12 in FIG. 5, the arbitration unit 23 immediately determines that condition (1)-4 is true and supplies power to the receiver 5 (operation state A1, FIG. 3).

In this case, if the arbitration unit 23 determines that neither condition (2)-1 or (2)-2 is true but condition (3)-2 is true after the receiver power stabilizing state J2, it waits in the smart reception standby state J5. It then sets the smart control usage flag Srco and sends the data collection start instruction to the receiver control unit 24 (operation state A3 in FIG. 3), and enters the Srco set state J6. As a result, use of the receiver 5 is granted to the smart control unit 22. When the smart control unit 22 then completes the verification process and clears the smart control usage flag Srco, the arbitration unit 23 enters operation state A4 in FIG. 3, and then returns to the receiver power-off state J1.

It should be noted that operation from time t13 to t14 in FIG. 5 is basically the same as between time t11 to t12. However, because the arbitration unit 23 is not in the receiver power-off state J1 and the smart control usage flag Srco is already set, setting of the immediate smart control request flag Se by the smart control unit 22 has no effect on the operation of the arbitration unit 23 as shown in FIG. 5.

Furthermore, operation from time t14 to t16 is basically the same as when the immediate smart control request flag Se is set just before time t12 as described above. However, when the arbitration unit 23 has already set the smart control usage flag Srco, condition (1)-3 becoming true has no effect on the operation of the arbitration unit 23 as shown in FIG. 5. However, because the smart period start request flag Srq is cleared at time t17 in FIG. 5, none of conditions (1)-1 to (1)-4 is true, and the arbitration unit 23 remains in the receiver power-off state J1.

Figure 6:
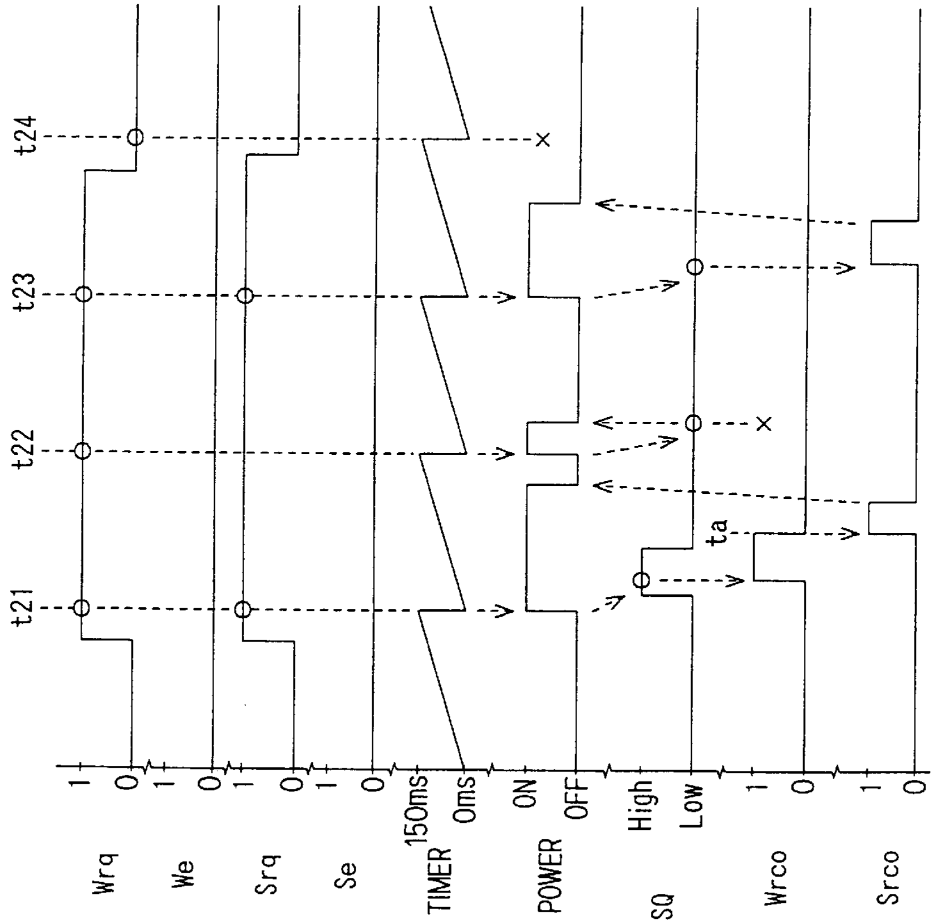
FIG. 6 is a third timing diagram showing operation of the arbitration unit.

Referring next to FIG. 6, it is assumed that the arbitration unit 23 is in the receiver power-off state J1. Just before time t21, the wireless control unit 21 sets the start wireless period request flag Wrq and the smart control unit 22 sets the smart period start request flag Srq.

This results in conditions (1)-1 and (1)-3 being true at time t21. As a result, the arbitration unit 23 sends the receiver power-on instruction to the receiver control unit 24 to supply power to the receiver 5 (operation state A1 in FIG. 3), and then enters the receiver power stabilizing state J2.

When specified period Tw1 passes, arbitration unit 23 checks if condition (2)-1 or (2)-2 is true. In this case the value of the RF presence signal SQ indicates there is a RF signal present and condition (2)-1 is therefore true. The arbitration unit 23 therefore waits in the wireless reception standby state J3, then sets the wireless control usage flag Wrco and sends the data collection start instruction to the receiver control unit 24 (operation state A2 in FIG. 3), and enters the Wrco set state J4. That is, because the receiver 5 is receiving a wireless signal in this case, use of the receiver 5 is granted to the wireless control unit 21.

The wireless control unit 21 thus receives data, and clears the wireless control usage flag Wrco when the data receiving process is completed as indicated at time ta.

When the wireless control usage flag Wrco is cleared, the arbitration unit 23 checks if condition (4)-1 or (4)-2 is true. In this case the smart control unit 22 has set the smart period start request flag Srq, and the smart period start event flag St is also set. Condition (4)-1 is therefore true.

When the wireless control unit 21 clears the wireless control usage flag Wrco at time ta, arbitration unit 23 sets the smart control usage flag Srco and sends the data collection start instruction to the receiver control unit 24 (operation state A5 in FIG. 3), and enters the Srco set state J6.

In this case, therefore, power supply to the receiver 5 is not stopped and the receiver 5 usage privilege is given to the smart control unit 22 because the smart control unit 22 is indicating a need to use the receiver 5 at the time (time ta) the wireless control unit 21 releases use of the receiver 5.

The smart control unit 22 therefore runs the verification process and clears the smart control usage flag Srco when the verification process ends.

After completing the operation state A4 in FIG. 3, the arbitration unit 23 then returns to the receiver power-off state J1.

The operation at the next time t22 to t23 in FIG. 6 is the same as that at time t2 to t3 in FIG. 4. That is, because the smart period start request flag Srq is set but the smart period start event flag St is reset at time t22 to t23 in FIG. 6, the arbitration unit 23 performs the same sequence as between time t2 to t3 in FIG. 4, that is: receiver power-off state J1→ operation state A1→ receiver power stabilizing state J2→ operation state A4→ receiver power-off state J1.

Furthermore, operation from time t23 to t24 in FIG. 6 is the same as from time t11 to t12 in FIG. 5.

That is, also at time t23 to t24 in FIG. 6, the RF presence signal SQ after supplying power to the receiver 5 is set to "no signal." The arbitration unit 23 therefore performs the same sequence as from time t11 to t12 in FIG. 5, that is:

receiver power-off state J1→ operation state A1→ receiver power stabilizing state J2→ smart reception standby state J5→ operation state A3→ Srco set state J6→ operation state A4→ receiver power-off state J1.

At time t24 in FIG. 6 both request flags Wrq and Srq are cleared, conditions (1)-1 to (1)-4 are therefore not true, and arbitration unit 23 remains at receiver power-off state J1.

Figure 7:
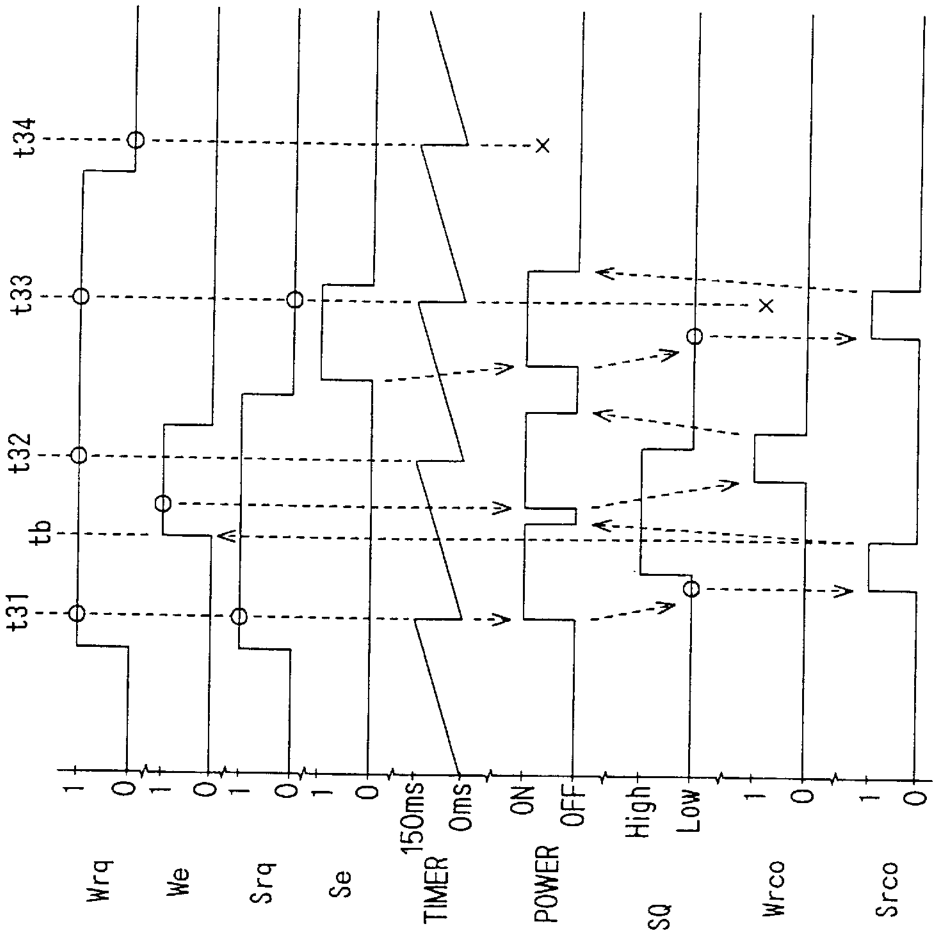
FIG. 7 is a fourth timing diagram showing operation of the arbitration unit.

Referring next to FIG. 7, it is assumed that when the arbitration unit 23 is in the receiver power-off state J1, the wireless control unit 21 sets the start wireless period request flag Wrq and the smart control unit 22 sets the smart period start request flag Srq just before time t31.

This results in conditions (1)-1 and (1)-3 being true at time t31. As a result, the arbitration unit 23 sends the receiver power on instruction to the receiver 5 (operation state A1 in FIG. 3), and then enters the receiver power stabilizing state J2.

When specified period Tw1 passes, arbitration unit 23 checks if condition (2)-1 or (2)-2 is true. In this case the value of the RF presence signal SQ indicates a RF signal is not present and the immediate wireless control request flag We is not set. Conditions (2)-1 and (2)-2 are therefore not true.

The arbitration unit 23 then checks if condition (3)-1 or (3)-2 is true. Condition (3)-1 is true in this case because the smart period start request flag Srq is set. The smart control usage flag Srco is therefore set. That is, the arbitration unit 23 performs the sequence, that is: smart reception standby state J5→ operation state A3→ Srco set state J6. The smart control unit 22 is given use of the receiver 5.

It is further assumed that the received data decoder unit 25 determines that the content of the data received from the receiver control unit 24 is the content of a signal used for wireless control (a lock signal or unlock signal) when the smart control usage flag Srco is set (that is, arbitration unit 23 has given the smart control unit 22 use of the receiver 5). The received data decoder unit 25 therefore sends the usage privilege cancellation instruction to the smart control unit 22 to release use of the receiver 5, and sends the usage privilege acquisition instruction to the wireless control unit 21 to acquire usage privileges of receiver 5.

As a result, the smart control unit 22 immediately clears the smart control usage flag Srco at time tb in FIG. 7 to release use of the receiver 5, and wireless control unit 21 sets the immediate wireless control request flag We.

When the smart control usage flag Srco is cleared at time tb, the arbitration unit 23 executes the sequence, that is: Srco set state J6→ operation state A4→ receiver power-off state J1. However, because the immediate wireless control request flag We is set when the receiver power-off state J1 is resumed (that is, condition (1)-1 is true), the arbitration unit 23 immediately transitions through the sequence receiver power-off state J1→ operation state A1→ receiver power stabilizing state J2. Furthermore, because the immediate wireless control request flag We is set (that is, condition (2)-2 is true) when it leaves the receiver power stabilizing state J2, the arbitration unit 23 goes through the sequence wireless reception standby state J3→ operation state A2→ Wrco set state J4.

The wireless control unit 21 thus receives data, and then clears the wireless control usage flag Wrco and immediate wireless control request flag We when the receive process ends.

The arbitration unit 23 thus checks if condition (4)-1 or (4)-2 is true. However, because the smart period start request flag Srq is set but the smart period start event flag St is cleared by the arbitration unit 23 immediately after time tb as a result of operation state A4, and the immediate smart control request flag Se is not set, conditions (4)-1 and (4)-2 are not true. The arbitration unit 23 therefore resumes the receiver power-off state J1 after completing operation state A4 (FIG. 3).

As described above, when use of receiver 5 is assigned to the smart control unit 22 by the arbitration unit 23, the security ECU 1 checks whether the receiver 5 received a wireless control operating signal (a lock signal or unlock signal) from the electronic key 3. If it did, the smart control unit 22 is instructed to release access to the receiver 5 and the arbitration unit 23 is instructed to allocate use of the receiver 5 to the wireless control unit 21.

It should be noted that the operation in FIG. 7 from when the immediate smart control request flag Se is set just before time t33 until the receiver power turns off (power supply to the receiver stops) is the same as shown from time t14 to t16 in FIG. 5. Furthermore, conditions (1)-1 to (1)-4 are not true at time t34 in FIG. 7 because the request flags Wrq and Srq are both cleared, and the arbitration unit 23 remains in the receiver power-off state J1.

The operations in this embodiment whereby the wireless control unit 21 sets the start wireless period request flag Wrq and the smart control unit 22 sets the smart period start request flag Srq or immediate smart control request flag Se are equivalent to operations sending the usage privilege acquisition instruction indicating a request to use the receiver 5.

The operation whereby the wireless control unit 21 clears the wireless control usage flag Wrco and the operation whereby the smart control unit 22 clears the smart control usage flag Srco are equivalent to operations outputting the usage privilege cancellation instruction to release use of the receiver 5.

As described above, the security ECU 1 of an electronic key system according to this preferred embodiment of the invention supplies power to the receiver 5 so that the receiver 5 operates when the arbitration unit 23 detects the usage privilege acquisition instruction for using the receiver 5 from the wireless control unit 21 or smart control unit 22. When the arbitration unit 23 then detects that the receiver 5 has received a wireless signal from the electronic key 3, it gives the wireless control unit 21 use of the receiver 5 so that the wireless control unit 21 can receive data. However, if the receiver 5 has not received a wireless signal and the smart control unit 22 has issued the usage privilege acquisition instruction, the arbitration unit 23 gives the smart control unit 22 use of the receiver 5. If the arbitration unit 23 has given the wireless control unit 21 or smart control unit 22 use of the receiver 5 and the unit using the receiver 5 outputs the usage privilege cancellation instruction indicating it is releasing use of the receiver 5, the arbitration unit 23 stops power supply to the receiver and thus stops operation of the receiver 5.

The security ECU 1 of this preferred embodiment thus drives the receiver 5 when the usage privilege acquisition instruction is issued by either the wireless control unit 21 or smart control unit 22, allocates use of the receiver 5 to the wireless control unit 21 if a wireless signal is received from the electronic key 3, and thus enables the wireless control unit 21 to receive and decode data. That is, if a wireless signal is received when the receiver 5 operates, the received signal is considered to be an operating command from the electronic key 3 resulting from operation of the electronic key 3 by the vehicle user. Therefore, even if the wireless control unit 21 has not output the usage privilege acquisition instruction for using the receiver 5, use of the receiver 5 is assigned to the wireless control unit 21 so that wireless control can be reliably executed. On the other hand, if a wireless signal is not received when the receiver 5 is operating, the receiver 5 usage privilege is passed to the smart control unit 22, thus enabling the verification process to be completed for smart control.

It will also be obvious from the preceding description of a security ECU 1 according to this preferred embodiment that a single receiver 5 can be used to achieve both wireless control whereby the door lock actuator 9 is driven according to an operating signal received by way of a wireless signal in conjunction with a user pressing a button, for example, on a electronic key 3, and smart control whereby the door lock actuator 9 is operated automatically after completing a two-way verification process with the electronic key 3 by way of wireless communication.

Moreover, when the arbitration unit 23 grants use of the receiver 5 to the smart control unit 22 with the security ECU 1 according to this preferred embodiment, received data decoder unit 25 checks if the receiver 5 received an operating signal for wireless control from the electronic key 3. If an operating signal was received, the smart control unit 22 is instructed to release use of the receiver 5, and the arbitration unit 23 is instructed to grant use of the receiver 5 to the wireless control unit 21.

This means that if an operating instruction is received from the electronic key 3 as a result of an operation by the vehicle user while the smart control unit 22 has use of the receiver 5 and is communicating with the electronic key 3 as unit of the verification process, use of the receiver 5 passes from the smart control unit 22 to the wireless control unit 21 so that the received operating signal can be immediately handled. In other words, operating signals from the electronic key 3 are sent as a result of some operation by a user. If smart control by the smart control unit 22 continues in such cases, the command issued by the human user may be ignored and not executed. However, by passing receiver usage privileges from the smart control unit 22 to the wireless control unit 21, the door lock actuator 9 can reliably be wirelessly controlled in accordance with the intention of the user.

As also described above with reference to FIG. 6, the arbitration unit 23 of the security ECU 1 according to this preferred embodiment grants use of the receiver 5 to the smart control unit 22 without stopping the power supply to the receiver 5 if the smart control unit 22 has issued the usage privilege acquisition instruction to use the receiver 5 when the wireless control unit 21 completes the data receiving process and releases use of the receiver 5.

This means that if some sort of failure occurs such that the RF presence signal SQ input from receiver 5 to security ECU 1 is permanently high, indicating that an RF signal is present, and it appears that the receiver 5 is constantly is receiving a wireless signal, use of the receiver 5 can still be passed to the smart control unit 22 so that smart control will not be disabled.

Although the present invention has been described in connection with a preferred embodiment thereof with reference to the accompanying drawings, it is to be noted that various changes and modifications will be apparent to those skilled in the art.

For example, the door lock actuator 9 is connected to the security ECU 1 in the above embodiment. However, the door lock actuator 9 can be operated through door ECU 13 if the door lock actuator 9 is connected to the door ECU 13 and the security ECU 1 communicates with the door ECU 13.

It will also be obvious that while the present invention has been described with application to an electronic key system for a motor vehicle, the invention shall not be limited to such an electronic key system and can also be applied to other types of systems such as home security systems.

What is claimed is:

1. An electronic control system comprising:

a communication device carried by a user for transmitting a wireless signal;

a receiver for receiving the wireless signal from the communication device;

a transmitter for transmitting a wireless signal to the communication device;

a wireless control means for using the receiver to receive an operating signal transmitted from the communication device as the wireless signal to operate a specific device, the operating signal being generated by a manual operation of the communication device;

a smart control means for driving the transmitter to transmit a transmitter signal and using the receiver to receive a response signal from the communication device transmitted as the wireless signal in return to the transmitter signal, and automatically controlling the specific device in response to the response signal from the communication device; and an arbitration means for granting a receiver usage privilege to one of the wireless control means and the smart control means, wherein the arbitration means supplies power to the receiver to operate the receiver if a receiver usage privilege acquisition instruction is output from either one of the wireless control means and the smart control means, assigns a receiver usage privilege to the wireless control means to enable the wireless control means to receive data if the receiver received the wireless signal, and assigns the receiver usage privilege to the smart control means if the receiver did not receive the wireless signal and the smart control means has output the usage privilege acquisition instruction.

2. An electronic control system as in claim 1, wherein the arbitration means stops power supply to the receiver and stops receiver operation, if a receiver usage privilege cancellation instruction is output from one of the wireless control means and the smart control means to which the receiver usage privilege has been assigned.

3. An electronic control system as in claim 1, wherein the smart control means executes a verification process to check if the communication device is an authorized communication device, and enables an automatic control of the specific device if the communication device is verified as an authorized device.

4. An electronic control system as in claim 1, further comprising:

a usage privilege change means for checking if the receiver receives the operating signal from the communication device when the receiver use privilege has been assigned to the smart control means by the arbitration means, and instructing the smart control means to output the usage privilege cancellation instruction and instructing the arbitration means to assign the receiver usage privilege to the wireless control means if the receiver receives the operating signal.

5. An electronic control system as in claim 1, wherein the arbitration means does not stop power supply to the receiver and assigns the receiver usage privilege to the smart control means if the smart control means is outputting the usage privilege acquisition instruction when the wireless control means completes a data receiving process and outputs the usage privilege cancellation instruction.

6. An electronic control system as in claim 1, wherein the specific device is a vehicle door lock actuator.

7. An electronic control system comprising:

a communication device capable of being carried by a user for transmitting a wireless signal including an operating signal capable of being generated by manual operation of the communication device, and a response signal;

a single receiver configured to receive the wireless signal from the communication device;

a transmitter configured to transmit a transmitter signal to the communication device;

a wireless control configured to receive the operating signal, the operating signal configured cause the wireless control to operate a specific device;

a smart control configured to:

cause the transmitter to transmit the transmitter signal, receive a response signal from the communication device in response to the transmitter signal, output a usage privilege acquisition instruction, and automatically control the specific device in response to receiving the response signal; and an arbitrator configured to:

grant the single receiver a usage privilege to the wireless control means and enable the wireless control to receive data associated with operating the specific device if the operating signal was received by the single receiver, and grant the single receiver the usage privilege to the smart control to enable the transmitter to transmit the transmitter signal for a communication with the communication device to obtain a verification using the response signal if the operating signal was not received by the single receiver and if the smart control means has output the usage privilege acquisition instruction.

8. An electronic control system as in claim 7, wherein:

the communication device includes an actuator configured to generate the operating signal in response to operation of the actuator, and the communication device is configured to generate the response signal in response to the transmission signal from the transmitter when the actuator is not operated.

* * * * *